(12) United States Patent
Tomihashi et al.

(10) Patent No.: US 7,550,530 B2
(45) Date of Patent: Jun. 23, 2009

(54) WATER-BASED FLUORORUBBER COMPOSITION FOR VULCANIZATION AND COATED ARTICLE

(75) Inventors: Nobuyuki Tomihashi, Settsu (JP); Koichiro Ogita, Settsu (JP); Kiyotaro Terasaka, Settsu (JP)

(73) Assignee: Daikin Industries Ltd., Osaka (JP)

( * ) Notice: Subject to any disclaimer, the term of this patent is extended or adjusted under 35 U.S.C. 154(b) by 313 days.

(21) Appl. No.: 10/558,981

(22) PCT Filed: Jun. 1, 2004

(86) PCT No.: PCT/JP2004/007517

§ 371 (c)(1), (2), (4) Date: Dec. 2, 2005

(87) PCT Pub. No.: WO2004/108820

PCT Pub. Date: Dec. 16, 2004

(65) Prior Publication Data

US 2007/0060698 A1    Mar. 15, 2007

(30) Foreign Application Priority Data

Jun. 5, 2003    (JP) .............................. 2003-161230

(51) Int. Cl.
    *C08G 75/02*    (2006.01)
(52) U.S. Cl. ....................... 524/520; 428/375; 524/456; 524/544
(58) Field of Classification Search ................. 524/520, 524/544, 456; 428/375
    See application file for complete search history.

(56) References Cited

U.S. PATENT DOCUMENTS

| | | | |
|---|---|---|---|
| 4,358,559 A * | 11/1982 | Holcomb et al. | ............ 524/380 |
| 4,391,930 A | 7/1983 | Olson | |
| 4,618,641 A | 10/1986 | Hengel | |
| 4,740,536 A * | 4/1988 | Chao | ............ 523/406 |
| 5,604,283 A | 2/1997 | Wada et al. | |
| 6,180,727 B1 * | 1/2001 | Ghosh | ............ 525/524 |
| 6,252,006 B1 | 6/2001 | Tomihashi et al. | |
| 6,325,752 B1 | 12/2001 | Tomihashi et al. | |
| 6,664,336 B1 | 12/2003 | Tomihashi et al. | |
| 6,720,381 B1 | 4/2004 | Tomihashi et al. | |
| 6,764,763 B1 * | 7/2004 | Tomihashi et al. | .......... 428/375 |

FOREIGN PATENT DOCUMENTS

| | | |
|---|---|---|
| EP | 0 051 823 A1 | 5/1982 |
| EP | 0 179 305 A2 | 9/1985 |
| EP | 0 554 463 A1 | 8/1993 |
| EP | 1 167 442 A1 | 1/2002 |
| EP | 1167442 A1 * | 1/2002 |
| JP | 57-108147 | 7/1982 |
| JP | 57-108147 A | 7/1982 |
| JP | 61-123646 | 6/1986 |
| JP | 61-123646 A | 6/1986 |
| JP | 61-166843 | 7/1986 |
| JP | 61-166843 A | 7/1986 |
| JP | 10-7863 | 1/1998 |
| JP | 10-7863 A | 1/1998 |
| JP | 11-310748 | 11/1999 |
| JP | 11-310748 A | 11/1999 |
| WO | WO 93/04134 | 3/1993 |
| WO | WO 93/04134 A1 | 3/1993 |
| WO | WO 98/07784 | 2/1998 |
| WO | WO 99/07798 | 2/1999 |
| WO | WO 99/07798 A1 | 2/1999 |
| WO | WO 99/43749 | 9/1999 |
| WO | WO 00/53675 | 9/2000 |
| WO | WO 00/53675 A1 | 9/2000 |
| WO | WO 00/56825 | 9/2000 |
| WO | WO 00/56825 A1 | 9/2000 |
| WO | WO 01/25330 A1 | 4/2001 |
| WO | WO-2004/108820 A1 * | 12/2004 |

* cited by examiner

*Primary Examiner*—Peter D. Mulcahy
*Assistant Examiner*—Henry Hu
(74) *Attorney, Agent, or Firm*—Sughrue Mion, PLLC

(57) ABSTRACT

An aqueous fluoroelastomer curable composition including two liquids of a main material fluoroelastomer aqueous dispersion (I) and a fluoroelastomer-curing agent aqueous solution (II), wherein the above main material fluoroelastomer aqueous dispersion (I) is an aqueous dispersion having a pH of 6.5 to 8.5, comprising a fluoroelastomer (A), a dispersant (B), an acid acceptor (C) and a salt (D) composed of an acid with a pKa of 3 to 7 and a base with a pKa of 8 to 12, and the above fluoroelastomer-curing agent aqueous solution (II) is an aqueous solution including a fluoroelastomer-curing agent.

7 Claims, No Drawings

WATER-BASED FLUORORUBBER COMPOSITION FOR VULCANIZATION AND COATED ARTICLE

TECHNICAL FIELD

The present invention relates to an aqueous fluoroelastomer curable composition and a coated article.

BACKGROUND ART

Fluoroelastomer coating compositions are in wide use as industrial materials, for example for coating or impregnating textiles, fibers, metals, plastics, rubbers and other various base materials or substrates therewith, making the most of the good heat resistance, weather resistance, oil resistance, solvent resistance and chemical resistance of fluoroelastomers.

Fluoroelastomer coating compositions, when formulated as one-liquid type compositions using a polyamine as a curing agent, in particular, show poor storage stability, namely they gelate before application, so that they are generally prepared in the form of two-liquid type compositions comprising a fluoroelastomer-containing main material and a curing agent. In the case of aqueous dispersions, however, there arises a problem, namely the storage stability is easily lost due to aggregation of dispersed particles even when they are of a two-liquid type.

Fluoroelastomer coating materials generally contain an acid acceptor for trapping hydrofluoric acid formed upon crosslinking. In the art, metal oxides such as MgO have been used as acid acceptors. Meanwhile, aqueous coating compositions comprising an inorganic double compound have been proposed as ones improved in storage stability as compared with the metal oxide-containing ones (cf. e.g. Patent Document 1).

When a polyol curing type is employed for fluoroelastomer coating materials, a curing accelerator is generally used. In the art, the curing accelerator is added to the curing agent side, not to the main material side, since it is readily anticipated that the addition thereof to the main material side will produce such a problem as a deterioration in stability of the main material. In particular, in the case of aqueous fluoroelastomer coating materials of the polyol curing type, it has been a common practice to add the curing accelerator to the curing agent side according to the artisans' estimation of the possibility of the addition of the curing accelerator added to the main material side inducing the curing reaction therewith.

The use, as a curing accelerator, of a salt or complex of a basic compound with a pKa of not lower than 8 and an organic acid has been proposed for improving the storage stability of a fluoroelastomer coating composition (cf. e.g. Patent Document 2 and Patent Document 3). This coating composition is of the one-liquid type and the basic compound and organic acid are blended as such with the other components without preliminary formation of a salt or the like.

In the art, an alkylphenol-based dispersant is generally used in an aqueous dispersion of fluoroelastomer coating materials for dispersing the fluoroelastomer polymers. On recent years, however, this raw material has become suspected to be an endocrine disrupter, and compositions in which a polyoxyethylene alkyl ether is used as an alternative have been proposed (cf. e.g. Patent Document 4). However, there is a problem; polyoxyethylene alkyl ethers are inferior in dispersing ability to alkylphenol-based dispersants.

Patent Document 1: International Laid-open Publication Wo 99/07798;

Patent Document 2: International Laid-open Publication WO 98/07784;

Patent Document 3: International Laid-open Publication WO 99/43749;

Patent Document 4: International Laid-open Publication WO 00/53675.

DISCLOSURE OF INVENTION

Problems Which the Invention is to Solve

In view of the above-discussed state of the art, it is an object of the present invention to provide an aqueous fluoroelastomer curable composition which is excellent in storage stability.

Means for Solving the Problems

The present invention provides an aqueous fluoroelastomer curable composition comprising two liquids of a main material fluoroelastomer aqueous dispersion (I) and a fluoroelastomer-curing agent aqueous solution (II), wherein the above main material fluoroelastomer aqueous dispersion (I) is an aqueous dispersion having a pH of 6.5 to 8.5 and comprising a fluoroelastomer (A), a dispersant (B), an acid acceptor (C) and a salt (D) composed of an acid with a pKa of 3 to 7 and a base with a pKa of 8 to 12, and the above fluoroelastomer-curing agent aqueous solution (II) is an aqueous solution comprising a fluoroelastomer-curing agent.

The invention further provides a coated article comprising a substrate and a coating film obtained by applying the above aqueous fluoroelastomer curable composition, onto the above substrate, followed by baking.

The invention still further provides a coated article comprising a substrate, a coating film obtained by applying the above aqueous fluoroelastomer curable composition, onto the above substrate, followed by baking, and a fluororesin layer formed on the above coating film.

In the following, the present invention is described in detail.

The aqueous fluoroelastomer curable composition according to the invention comprises two liquids of a main material fluoroelastomer aqueous dispersion (I) and a fluoroelastomer-curing agent aqueous solution (II).

The aqueous fluoroelastomer curable composition according to the invention, which comprises two liquids so as to avoid untimely curing, is, as a whole, excellent in storage stability owing to the increased dispersion stability of the main material fluoroelastomer aqueous dispersion (I); even such a level of storage stability that is higher as compared with the conventional aqueous fluoroelastomer curable compositions in which alkylphenol-based dispersants excellent in dispersing ability are used. The main material fluoroelastomer aqueous dispersion (I) and fluoroelastomer-curing agent aqueous solution (II) are mixed up prior to use thereof for coating or other purposes.

The main material fluoroelastomer aqueous dispersion (I) is an aqueous dispersion having a pH of 6.5 to 8.5 and comprising a fluoroelastomer (A), a dispersant (B), an acid acceptor (C) and a salt (D) composed of an acid with a pKa of 3 to 7 and a base with a pKa of 8 to 12.

The fluoroelastomer (A) is a copolymer of a hydrogen atom-containing monomer having one or more hydrogen atoms and a hydrogen atom-free monomer having no hydrogen atom.

The hydrogen atom-containing monomer includes ethylene [Et], propylene, vinyl fluoride, vinylidene fluoride [VdF], and trifluoroethylene, among others.

The hydrogen atom-free monomer includes, among others, chlorotrifluoroethylene [CTFE], tetrafluoroethylene [TFE], hexafluoropropylene [HFP], and fluorovinyl ethers represented by the general formula (I):

$$CF_2=CF-O-R^2 \qquad (I)$$

(wherein $R^2$ represents an alkyl group containing 1 to 20 carbon atoms, which may optionally contain at most 4 oxygen atoms and may optionally be substituted by one or more fluorine atoms).

The hydrogen atom-containing monomer and hydrogen atom-free monomer each may comprise one single species or a combination of two or more species. Preferably used as the hydrogen atom-containing monomer and hydrogen atom-free monomer are a hydrogen atom-containing monomer comprising a pendant group-containing one and a hydrogen atom-free monomer having no pendant group in combination with each other, or a hydrogen atom-containing monomer having no pendant group and a hydrogen atom-free monomer comprising a pendant group-containing one in combination with each other. The pendent group is a group of atoms which serves as a side chain in the molecular chain of the copolymer obtained.

As the fluoroelastomer (A), there may be mentioned VdF/HFP copolymers, VdF/TFE/HFP copolymers, Et/HFP copolymers, and TFE/propylene copolymers, among others. In the present specification, the fluoroelastomer (A) in the main material fluoroelastomer aqueous dispersion (I) is a copolymer not yet crosslinked by the curing agent.

The fluoroelastomer (A) is generally one obtained by emulsion polymerization in the presence of an aqueous polymerization initiator such as ammonium persulfate or potassium persulfate.

The aqueous dispersion (latex) comprising the fluoroelastomer (A) as obtained by emulsion polymerization may be subjected to such after-treatment as concentration where desirable. Care should be taken on that occasion, however, since such after-treatment as concentration during which particles of the fluoroelastomer (A) may possibly come into contact with one another tends to result in reduced dispersion stability. The particles (primary particles) of the fluoroelastomer (A) in the latex are preferably adjusted to an average particle diameter of 0.1 to 0.4 μm. When the average particle diameter is smaller than 0.1 μm, trouble likely arises from the film-forming properties viewpoint and, when it is greater than 0.4 μm, the dispersion stability tends to become poor.

The fluoroelastomer (A) has a low glass transition temperature [Tg] and, upon contacting of primary particles of the fluoroelastomer (A) with one another, they are readily fused together, easily resulting in aggregation without restoring their original primary particle form, hence it is generally necessary to take better care, as compared with fluororesins, to maintain the dispersion stability.

The dispersant (B) is not particularly restricted but may be, for example, such a nonionic surfactant as an aliphatic polyoxyalkylene ether dispersant or an aromatic polyoxyalkylene ether dispersant, or such an anionic surfactant as a lauryl sulfate salt, a perfluoroalkylcarboxylic acid salt or an ω-hydroperfluoroalkylcarboxylic acid salt.

As the aliphatic polyoxyalkylene ether dispersant, there may be mentioned polyethylene glycol derivatives such as alkyl polyethylene glycol ethers and alkyl polyethylene glycol esters; and polyethylene glycol/polypropylene glycol derivatives such as alkyl (polyethylene glycol/polypropylene glycol) copolymers, among others. As the aromatic polyoxyalkylene ether dispersant, there may be mentioned alkylphenyl polyethylene glycol ethers and alkylphenyl polyethylene glycol esters, among others.

Among those, the aliphatic polyoxyalkylene ether dispersant (hereinafter sometimes referred to as "aliphatic polyoxyalkylene ether dispersant (B1)") is preferred as the dispersant (B).

The aliphatic polyoxyalkylene ether dispersant (B1) is a nonionic surfactant having no aromatic ring.

The aliphatic polyoxyalkylene ether dispersant (B1) is selected based on the HLB which is an indicator of the balance between hydrophilicity and hydrophobicity, and one having an HLB of 8 to 14 is adequately used as the dispersant in the aqueous fluoroelastomer curable composition according to the invention. However, a surfactant lower in HLB than 8 also can be used as a thickening agent, and a surfactant higher in HLB than 14 as a dispersion stabilizer, in preparing the aqueous fluoroelastomer curable composition according to the invention. The virgin latex (aqueous emulsion) containing the fluoroelastomer (A) generally contains 15 to 40% by mass of the fluoroelastomer (A) in the form of particles. Preferably, for improving the dispersion stability of the particles of the fluoroelastomer (A), an aliphatic polyoxyalkylene ether dispersant (B1) such as mentioned above that has an HLB value of 10 to 13 is first added to the latex, the resulting mixture is concentrated to a fluoroelastomer (A) particle concentration of 60 to 70% by mass, and such a dispersant having an HLB value of 13 to 16 is added to adjust the dispersion stability.

In cases where two species different in the range of HLB are used as the aliphatic polyoxyalkylene ether dispersant (B1), as mentioned above, it is preferred from the dispersion stability viewpoint that the mass proportion [p/(p+q)] of the one having an HLB of 10 to 13 as calculated based on the sum of the mass [p] of that one having an HLB of 10 to 13 and the mass [q] of the one having an HLB of 13 to 16 be 60 to 90% by mass. A more preferred lower limit is 70% by mass, and a more preferred upper limit is 80% by mass.

Preferred as the aliphatic polyoxyalkylene ether dispersant (B1) among the dispersants (B) are those ones which comprise an aliphatic polyoxyalkylene ether compound represented by the general formula (i):

$$R^1O(C_2H_4O)_n(C_3H_6O)_mH \qquad (i)$$

(wherein $R^1$ represents a straight or branched, saturated or unsaturated acyclic aliphatic hydrocarbon group containing 8 to 18 carbon atoms or a saturated alicyclic hydrocarbon group containing 8 to 18 carbon atoms, n represents an integer of 3 to 25 and m represents an integer of 0 to 5).

The acyclic aliphatic hydrocarbon group represented by $R^1$ in the above general formula (i) is an aliphatic hydrocarbon group containing no cyclic structure. The saturated alicyclic hydrocarbon group represented by $R^1$ in the above general formula (i) is an aliphatic hydrocarbon group having a saturated cyclic structure(s). The saturated alicyclic hydrocarbon group may contain two or more cyclic structures provided that it contains 8 to 18 carbon atoms in total.

The saturated alicyclic hydrocarbon group represented by $R^1$ in the general formula (i) may have one or more straight or branched alkyl groups substituting the corresponding number of hydrogen atoms each bound to a carbon atom in the saturated cyclic structure provided that it, inclusive of the substituent or substituents, contains 8 to 18 carbon atoms in total.

A preferred upper limit to the number of carbon atoms in $R^1$ in the above general formula (i) is 16, a more preferred upper limit is 13, and a preferred lower limit thereto is 10, in view of the good dispersibility of the fluoroelastomer (A) particles. Still more preferably, the group $R^1$ contains 13 carbon atoms.

Particularly preferred as $R^1$ in the general formula (i) is a branched, saturated acyclic aliphatic hydrocarbon group containing 13 carbon atoms. As such a group, there may be mentioned an isotridecyl group, for instance.

In the above general formula (i), n represents an integer of 3 to 25.

A preferred lower limit to n in the general formula (i), which may vary depending on the number of carbon atoms contained in $R^1$, is generally 8, and a preferred upper limit is 12.

In the above general formula (i), m represents an integer of 0 to 5. When m in the general formula (i) is greater than 5, the aliphatic polyoxyalkylene ether dispersant (B1) shows a decreased level of solubility, hence decreases the dispersibility of the main material fluoroelastomer aqueous dispersion (I) obtained; on the occasion of application, the coating films may become uneven and the film-forming properties and the luster may possibly become deteriorated. The number m is preferably as small as possible from solubility points of view, and a preferred upper limit thereto is 3. More preferably, m is zero. It is not necessary for the oxypropylene group to be present.

More preferably, n in the above general formula (i) is 8 to 12, and m in the above general formula (i) is zero.

Hereinafter, the number of carbon atoms in the group R and the numbers n and m in the general formula (i) are reported each in terms of the mean of the values for respective molecules constituting the aliphatic polyoxyalkylene ether dispersant (B1).

The dispersant (B) preferably amounts to 2 to 20 parts by mass per 100 parts by mass of the solid matter in the main material fluoroelastomer aqueous dispersion (I). When the amount is smaller than 2 parts by mass, the dispersing ability may be insufficient and, when it is larger than 20 parts by mass, the strength and nonstickiness, among others, of the coating film formed on the occasion of application tend to decrease. A more preferred lower limit is 5 parts by mass, a still more preferred lower limit is 7 parts by mass, a more preferred upper limit is 15 parts by mass, and a still more preferred upper limit is 13 parts by mass. In cases where the above-mentioned aliphatic polyoxyalkylene ether dispersant (B1) is used as the dispersant (B), the content thereof is most preferably within the range mentioned above.

The above-mentioned solid matter in the main material fluoroelastomer aqueous dispersion (I) includes, within the meaning thereof, the solid matter of the fluoroelastomer (A), the solid matter of a fluororesin (E) optionally incorporated, which is to be described later herein, and the solid additive or additives optionally incorporated, such as a filler, a pigment and/or the like, in the main material fluororesin-containing aqueous dispersion (I). The solid matter of the fluoroelastomer (A) and the solid matter of the fluororesin (E) occur as polymer particles dispersed in the main material fluoroelastomer aqueous dispersion (I).

The acid acceptor (C) comprises a compound capable of binding with hydrogen fluoride.

The acid acceptor (C) is not particularly restricted but may be one insoluble in water or one scarcely soluble in water or soluble in water but having a pKa of 6 to 9. Thus, it may be, for example made of inorganic oxide-based acid acceptors such as lead oxide, zinc oxide and lead carbonate; and inorganic double compound-based acid acceptors such as hydrotalcite, among others. Among them, the inorganic double compound-based acid-acceptor (hereinafter sometimes referred to as "inorganic double compound-based acid acceptor (C1)") is preferred.

The inorganic double compound-based acid acceptor (C1) is an acid acceptor comprising an inorganic double compound capable of trapping hydrogen fluoride. The inorganic double compound is an inorganic compound comprising at least two of the metallic elements (inclusive of Si and Ge; hereinafter the same shall apply as far as the inorganic double compound is concerned) and an electron-donating atom(s) or atomic group(s), and at least one of the at least two metallic elements is an alkaline earth metal element.

Strongly basic compounds such as calcium hydroxide and magnesium oxide are not preferred since it is difficult to adjust the pH to a required level with them.

Preferred as the inorganic double compound are, for example, inorganic double compounds represented by the general formula (ii):

(wherein $M^1, \ldots M^x$ each independently represents a metallic element or a metal cation, $X^1, \ldots X^x$ each independently represents an atom such as an oxygen, halogen, nitrogen, sulfur or phosphorus atom, a molecule such as an ammonia or carbon dioxide, or an anion such as $OH^-$, $F^-$, $Cl^-$, $Br^-$, $I^-$, $CN^-$, $SCN^-$, $CO_3^{2-}$, $NO^{3-}$, $SO_4^{2-}$ or $PO_4^{3-}$, x represents an integer of 2 to 10 and y represents an integer of 0 to 20 provided that at least one of the above-given $M^1, \ldots$ and $M^x$ represents an alkaline earth metal element).

The inorganic double compound is not particularly restricted but includes, among others, double oxides or double carbonates comprising an alkaline earth metal element such as magnesium, calcium or barium and a metallic element other than alkaline earth metal elements, such as silicon, manganese, nickel, molybdenum or aluminum. Hydrotalcite type double oxides can be used with advantage, among others.

The double oxide or double carbonate other than the above-mentioned hydrotalcite type double oxide is not particularly restricted but includes, among others, $Al_2O_3.CaO.2SiO_2$, $CaO.MgO.2SiO_2$, $2CaO.SiO_2$, $CaO.ZrO_2$, $CaCO_3$ $MgCO_3$, $MgO$ $Al_2O_3$, $3MgCO_3.Mg(OH)_2$, $SrF_2.SrCl_2$, $3SrO.Al_2O_3.6H_2O$, and $3BaO.2MnO_2$.

The hydrotalcite type double compound is a compound represented by the general formula (iii):

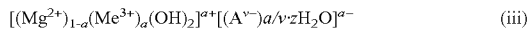

(wherein $Me^{3+}$ represents a trivalent metal cation, $A^{v-}$ represents an anion with a valence of v, v is an integer of 1 to 3, z represents an integer of 0 to 20 and a represents a positive number not higher than 0.33).

The trivalent metal cation is not particularly restricted but includes, among others, $Al^{3+}$, $Fe^{3+}$, $Cr^{3+}$, $Co^{3+}$ and $In^{3+}$. The anion with a valence v is, for example, $OH^-$, F, $Cl^-$, $Br^-$, $I^-$, $CN^-$, $SCN^-$, $CO_3^{2-}$, $NO_3^-$, $SO_4^{2-}$, $Fe(CN)_6^{3-}$, $CH_3COO^-$ or $(COO)_2^{2-}$. The hydrotalcite type double oxide is not particularly restricted but includes, among others, $Mg_6Al_2(OH)_{16}CO_3.4H_2O$, $Mg_{4.5}Al_2(OH)_{13}CO_3.3.5H_2O$, $Mg_4Al_2(OH)_{13.5}CO_3.3.5H_2O$, $Mg_{4.3}Al_2(OH)_{12.6}CO_3.mH_2O$.

Preferred as the inorganic double compound are those compounds which have a pKa value smaller than the pKa of the salt (D), which is to be described later herein, in view of their weak tendency to cause gelation.

The acid acceptor (C) is incorporated preferably in an amount of 1 to 40 parts by mass per 100 parts by mass of the solid matter of the fluoroelastomer (A) according to the activity thereof. In cases where the inorganic double compound-based acid acceptor (C1) is used as the acid acceptor (C), it is particularly preferred that the addition level thereof be within the above range.

The salt (D) is the salt of an acid with a pKa of 3 to 7 and a base with a pKa of 8 to 12.

When an acid with a pKa lower than 3 or above 7 is used, the pH adjustment is difficult to make, hence the stability of the main material fluoroelastomer aqueous dispersion (I) will be readily decreased. A preferred lower limit to the pKa of the acid is 3.5, and a preferred upper limit thereto is 6.5.

When a base with a pKa lower than 8 is used, the pH adjustment is difficult to perform and, when a base with a pKa higher than 12 is used, a curing reaction will proceed, readily causing gelation. A preferred lower limit to the pKa of the base is 8.5, and a preferred upper limit thereto is 11.5.

As for the pKa in the case of the acid being a polybasic acid and/or the base being a polyacidic base, it is only required that any one of the pKa values for the respective stages of stepwise ionic dissociation be within the above range.

The acid with a pKa of 3 to 7 is not particularly restricted but includes, among others, inorganic acids such as hydrogen fluoride and carbonic acid; monocarboxylic acids such as formic acid, acetic acid, propionic acid and lactic acid; dicarboxylic acids such as oxalic acid, malonic acid, succinic acid and malic acid; and tricarboxylic acids such as citric acid. Preferred are acetic acid, succinic acid and citric acid, each having a pKa=4 to 6. The base with a pKa of 8 to 12 is not particularly restricted but may be any of those species capable of forming salts with the acids mentioned above, including, among others, ammonia; primary amines such as methylamine, ethylamine, propylamine, butylamine, amylamine and monoethanolamine; secondary amines such as dimethylamine, diethylamine, di-n-propylamine, piperidine and pyrrolidine; and tertiary amines such as trimethylamine, triethylamine, tri-n-propylamine, tri-n-butylamine, triisobutylamine, methyldiethylamine, dimethylethylamine, dimethyl-n-propylamine, dimethyl-n-butylamine, dimethylisobutylamine, dimethylisopropylamine, dimethyl-sec-butylamine, dimethyl-tert-butylamine, triallylamine, diallylmethylamine, allyldimethylamine, benzyldimethylamine, benzyldiethylamine, N-allylpiperidine, N-ethylpiperidine, N-butylpiperidine, N-methylpyrrolidine, N-cyclohexylpyrrolidine, N-n-butylpyrrolidine, N-ethylpyrrolidine, N-benzylpyrrolidine, 2,4,6-trimethylpyridine and 1,8-diazabicyclo[5.4.0]-7-undecene. Among them, volatile basic compounds are preferred since they will not remain in the coating films and will not dissolve the fluoroelastomer (A). Preferred as the volatile basic compounds are ammonia and triethylamine, and ammonia is more preferred.

The salt (D) is formed in advance by reacting the acid with the base. The salt formed is then admixed with the other components contained in the main material fluoroelastomer aqueous dispersion (I), such as the fluoroelastomer (A), among others. If the acid and base are admixed, as such without preliminary salt formation from the acid and base, with the other components contained in the main material fluoroelastomer aqueous dispersion (I), the pH hardly will be stabilized and, furthermore, the neutralization reaction occurs to cause heat generation and, if the system temperature exceeds the cloud point of the aliphatic polyoxyalkylene ether dispersant (B1) or the like nonionic surfactant, the dispersion stability of the fluoroelastomer (A) will be lost; furthermore, when ammonia or the like is used as the base mentioned above, the base may induce curing of the fluoroelastomer (A).

In the case of the conventional two-liquid type fluoroelastomer aqueous dispersions of the polyol curing type, an organic acid and a quaternary ammonium salt are used as the curing accelerators and, since the addition of these curing accelerators to the fluoroelastomer aqueous dispersion as the main material causes such a problem as a decrease in dispersion stability, they are added to the curing agent side. In the case of the aqueous fluoroelastomer curable composition according to the invention, on the contrary, the salt (D) is used in the form preliminarily prepared by subjecting the acid and base to neutralization for salt formation, so that it can not only be added to the fluoroelastomer (A)-containing main material side but also act as a curing accelerator in the polyol curing type and further as a pH adjuster, which is important for the dispersion stability of the main material fluoroelastomer aqueous dispersion (I), irrespective of curing type. In the polyamine curing type, for instance, the salt (D) effectively functions as a pH adjuster for the main material fluoroelastomer aqueous dispersion (I).

The neutralization reaction between the acid with a pKa of 3 to 7 and the base with a pKa of 8 to 12 is preferably carried out using the acid and base in a mole ratio of 1:1 to 1:2. Preferably, the salt (D) gives aqueous solution with a pH of 8 to 9.

The salt (D) may undergo ionic dissociation in the main material fluoroelastomer aqueous dispersion (I).

The level of addition of the salt (D) is adjusted so that the pH of the main material fluoroelastomer aqueous dispersion (I) may have a pH within the range mentioned below.

The main material fluoroelastomer aqueous dispersion (I) has a pH of 6.5 to 8.5.

Within the pH range mentioned above, the main material fluoroelastomer aqueous dispersion (I) comprising particles of the fluoroelastomer (A) can maintain its dispersion stability. From the dispersion stability viewpoint, it is preferred that the pH of the main material fluoroelastomer aqueous dispersion (I) be within a weakly alkaline range. If the dispersion (I) is strongly alkaline, hydrogen fluoride will be eliminated from the fluoroelastomer (A)-constituting copolymer in the main material fluoroelastomer aqueous dispersion (I), causing aggregation and/or crosslinking within particles of the fluoroelastomer (A); thus, in certain instances, the dispersion stability is lost and, even if an attempt at application is made, it becomes difficult to form a coating film.

When the pH of the main material fluoroelastomer aqueous dispersion (I) is lower than 6.5, the usable life (pot life) of the mixture of the dispersion (I) with the fluoroelastomer-curing agent aqueous solution (II) as prepared by mixing up them on the occasion of application is short and, when it is higher than 8.5, the storage stability decreases. A preferred lower limit is 7.0, and a preferred upper limit is 8.0.

The conventional main material fluoroelastomer aqueous dispersions have a pH of about 9 to 10 and, at such an extent of strong alkalinity, only an insufficient extent of stability can be achieved. On the other hand, it is difficult in the art to render the pH of the fluoroelastomer (A)-containing aqueous dispersion weakly alkaline. On the contrary, the use of the above-mentioned salt (D) in the aqueous fluoroelastomer curable composition according to the invention and of the inorganic double compound type acid acceptor (C1) as the acid acceptor (C) in lieu of the alkaline metal oxide, such as magnesium oxide, which is in conventional use, makes it easy to adjust the pH to a weakly alkaline level and, as a result, the storage stability can be markedly improved. It is thus possible to adjust the pH of the above-mentioned aqueous fluoroelastomer curable composition to a weakly alkaline level and thereby improve the storage stability of that composition.

The main material fluoroelastomer aqueous dispersion (I) preferably has a viscosity of 50 to 500 mPa·s. When the viscosity is lower than 50 mPa·s, particles of the fluoroelastomer (A) can readily come into contact with one another, hence aggregation tends to occur. At levels exceeding 500 mPa·s, the applicability tends to deteriorate. A more preferred lower limit is 100 mPa·s, and a more preferred upper limit is 350 mPa·s.

From the storage stability point of view, the viscosity of the main material fluoroelastomer aqueous dispersion (I) is as important a factor as the pH of the main material fluoroelastomer aqueous dispersion (I) and the pKa values of the acid and base forming the salt (D).

The viscosity of the main material fluoroelastomer aqueous dispersion (I) can be adjusted using, for example, a thickening agent, which is to be described later herein.

The main material fluoroelastomer aqueous dispersion (I) comprises the above-mentioned fluoroelastomer (A), dispersant (B), acid acceptor (C) and salt (D), and may further contain a thickening agent.

The thickening agent to be used may be any of ionic thickening agents such as anionic thickening agents and cationic thickening agents, and nonionic thickening agents. Nonionic thickening agents are preferably used, however, since they will not disturb the dispersed system. In cases where the above-mentioned aliphatic polyoxyalkylene ether dispersant (B1) is used as the dispersant (B), nonionic thickening agents are particularly preferred.

When the aliphatic polyoxyalkylene ether dispersant (B1) is used as the dispersant (B), the nonionic thickening agent to be used is preferably one similar in chemical structure to the aliphatic polyoxyalkylene ether dispersant (B1) and, as such one, there may be mentioned those comprising aliphatic polyoxyalkylene ether compounds represented by the general formula (iv):

$$R^3O(C_2H_4O)_s(C_3H_6O)_t\text{—}Z\text{—}R^4 \quad (iv)$$

(wherein $R^3$ and $R^4$ are the same or different and each represents a straight or branched, saturated or unsaturated acyclic aliphatic hydrocarbon group containing 1 to 18 carbon atoms or a saturated alicyclic hydrocarbon group containing 1 to 18 carbon atoms, Z represents an ester bond [—COO—], a urethane bond [—NH—COO— or —COO—NH—] or a ketone bond [—CO—], s represents an integer of 3 to 25 and t represents an integer of 0 to 5).

The symbols $R^3$ and $R^4$ in the above general formula (iv) each is the same as $R^1$ in the general formula (i) given hereinabove. The integer s in the general formula (iv) may vary depending on the numbers of carbon atoms in $R^3$ and $R^4$. A preferred lower limit thereto is 8, and a preferred upper limit thereto is 12. The integer t in the general formula (iv) is preferably as small as possible from the solubility viewpoint, and a preferred upper limit is 3. More preferably, t is zero. More preferably, s in the general formula (iv) is 8 to 12 and t in the general formula (iv) is zero.

As commercially available species of the nonionic thickening agent, there may be mentioned San Nopco's SN Thickeners 601, 603, 612, 621N, A801, A806 and A812, among others.

Generally, the thickening agent is used preferably in an amount of 0.1 to 5% by mass relative to the total mass of the main material fluoroelastomer aqueous dispersion (I). A more preferred lower limit to the level of addition of the thickening agent is 0.2% by mass, and a more preferred upper limit is 2% by mass.

The fluoroelastomer-curing agent aqueous solution (II) in the aqueous fluoroelastomer curable composition according to the invention is an aqueous solution comprising a fluoroelastomer-curing agent.

The "fluoroelastomer-curing agent" so referred to herein is a curing agent for curing the fluoroelastomer (A). The fluoroelastomer-curing agent to be used is a polyamine type curing agent, a polyether type curing agent, or a peroxide type curing agent. The polyamine type curing agent, polyether type curing agent, and peroxide type curing agent are used in that order of preference from the viewpoint of the ease of use and/or frequency of use.

The polyamine type curing agent is not particularly restricted but includes, among others, aliphatic polyamines such as triethylenetetramine, tetraethylenepentamine, ethylenediamine, trimethylenediamine, ethanolamine and 3,9-bis(3-aminopropyl)-2,4,8,10-tetraoxa-2-spiro[5.5]undecane, and salts thereof; aromatic polyamines such as diaminodiphenylmethane, xylylenediamine, phenylenediamine and diaminodiphenyl sulfone, and salts thereof; and other polyamine compounds such as modified polyamines and polyamideamines.

The polyol type curing agent is not particularly restricted but includes, among others, phenol derivatives such as hydroquinone, bisphenol A and bisphenol AF; enol form hydroxyl group-containing polyhydroxy compounds such as phenol resins, and metal salts thereof; and compounds of the formula $R_f(CH_2OH)_2$ (in which $R_f$ represents a perfluoroalkylene group containing 1 to 500 carbon atoms).

The peroxide type curing agent is not particularly restricted but includes, among others, those which comprise a combination of a peroxide compound such as benzyl peroxide or azoisobutyronitrile and a vinyl or allyl compound such as a vinyl ether, a vinylsilane, pentaerythritol trimethacrylate or triallylisocyanurate.

Alternatively, polythiol compounds such as triazinethiol, 1,6-hexanedithiol, 4,4'-dimercaptodiphenyl and 1,5-naphthalenedithiol can also be used as the fluoroelastomer-curing agent.

The aqueous fluoroelastomer curable composition according to the invention comprises the above-mentioned fluoroelastomer (A), dispersant (B), acid acceptor (C), salt (D) and curing agent and may further comprise a fluororesin (E). Among the aqueous fluoroelastomer curable composition according to the invention, the one comprising the above-mentioned fluororesin (E) is herein sometimes referred to also as "fluororesin-containing fluoroelastomer composition".

The fluororesin (E) may be contained in either of the main material fluoroelastomer aqueous dispersion (I) and the fluoroelastomer-curing agent aqueous solution (II). From the dispersion stability viewpoint, however, it is preferably contained in the main material fluoroelastomer aqueous dispersion (I). The main material fluoroelastomer aqueous dispersion (I), even when it contains the fluororesin (E) as well, can maintain its dispersion stability owing not only to the dispersant (B) but also to the acid acceptor (C) and salt (D) in the same manner as the maintenance of the dispersion stability of the fluoroelastomer (A).

The fluororesin (E) is not particularly restricted but may be any of those fluororesin which are low in critical surface tension, for example polyvinylidene fluoride [PVdF], polychlorotrifluoroethylene [PCTFE], Et/TFE copolymers [ETFE], TFE/HFP copolymers [FEP], TFE/HFP/perfluoro (alkyl vinyl ether) [PAVE] copolymers [EPA], TFE/PAVE copolymers [PFA], polytetrafluoroethylene [PTFE], terminally modified EPA, terminally modified FEP and terminally modified PFA and, among these, one single species or a combination of two or more species can be used. The fluororesin (E) is preferably a fluororesin excellent in nonstickiness or lubricity depending on the intended use.

The amount of the fluororesin (E) is preferably larger than 0% by mass but not larger than 80% by mass relative to the total amount of the fluoroelastomer (A) and fluororesin (E). A more preferred lower limit is 10% by mass, and a more preferred upper limit is 70% by mass.

The particles of the fluororesin (E) preferably have a particle diameter of 0.1 to 0.4 µm although the particle diameter may vary depending on the intended use. A more preferred lower limit is 0.15 µm, and a more preferred upper limit is 0.35 µm.

The aqueous fluoroelastomer curable composition according to the invention may further contain, if desired, at least one additive. The additive is not particularly restricted but includes, among others, fillers, colorants, antifoaming agents and drying characteristics modifiers.

As the fillers, there may be mentioned carbon black, white carbon, calcium carbonate, zinc oxide, talc, diatomaceous earth, barium sulfate, etc. As the colorants, there may be mentioned inorganic pigments such as carbon, titanium oxide, red iron oxide, mica, cobalt oxide and chromium oxide; and organic pigments such as phthalocyanine pigments and perylene pigments.

The fillers, colorants, antifoaming agents and drying characteristics modifiers are generally incorporated in the main material fluoroelastomer aqueous dispersion (I).

The method of preparing the aqueous fluoroelastomer curable composition according to the invention is not particularly restricted but preferably comprises adding the dispersant (B) to the fluoroelastomer (A)-containing aqueous dispersion for dispersion stability, adding the acid acceptor (C), if desired together with the filler, further adding, for pH adjustment, the salt (D) prepared in advance by neutralization and adding the thickening agent, if desired, to prepare the main material fluoroelastomer aqueous dispersion (I), and separately preparing the fluoroelastomer-curing agent aqueous solution (II) using the fluoroelastomer-curing agent. On the occasion of use for application or the like, the above main material fluoroelastomer aqueous dispersion (I) and fluoroelastomer-curing agent aqueous solution (II) are mixed together to prepare a coating material. The colorants mentioned above are preferably added, in the form of a stabilized dispersion obtained by using the dispersant (B), in the step of preparing the coating material.

The aqueous fluoroelastomer curable composition according to the invention, which comprises two liquids of the aqueous dispersion comprising the fluoroelastomer (A) as the main material and the aqueous solution comprising the fluoroelastomer-curing agent, can maintain the dispersion stability until the two liquids are mixed up on the occasion of application; in addition, the pot life after mixing up is long, and the mixture is an aqueous composition, so that the mixed composition can be used favorably on the occasion of application from the environmental viewpoint as well as from the workability viewpoint.

The fluororesin (E) generally bleeds up onto the surface of the coating film in the course of application of the mixture of the two liquids, namely the main material fluoroelastomer aqueous dispersion (I) and fluoroelastomer-curing agent aqueous solution (II), onto a substrate and baking the coatings and, therefore, can suitably be used in those fields in which such surface characteristics as nonstickiness and lubricity of the fluororesin are required. When it contains the above-mentioned fluororesin (E) as well, the aqueous fluoroelastomer curable composition according to the invention can be adequately used in those fields in which not only the above-mentioned surface characteristics of the fluororesin but also elastic properties are required, since the fluoroelastomer (A) is more abundantly distributed on the substrate side to form a crosslinked structure and the fluororesin (E)-based component is abundantly distributed on that crosslinked structure and thus can form a graded coat. The graded coat formed from the above-mentioned fluoroelastomer (A) and fluororesin (E) can be appropriately used also in the fields of application where heat resistance is required.

The aqueous fluoroelastomer curable composition according to the invention, in which the main material fluoroelastomer aqueous dispersion (I) contains the acid acceptor (C) and salt (D) as well, shows good dispersion stability and, even when the aliphatic polyoxyalkylene ether dispersant (B1) generally inferior in dispersing ability to alkylphenol-based dispersants is used, the dispersion stability will not be impaired. The aqueous fluoroelastomer curable composition according to the invention, in which the aliphatic-polyoxyalkylene ether dispersant (B1) is used in lieu of the alkylphenol-based dispersant, can become one friendly to the environment.

The coated article of the invention comprises a substrate and a coating film obtained by applying the aqueous fluoroelastomer curable composition according to the invention, onto the substrate, followed by baking (hereinafter sometimes referred to as "coated article (1)").

The substrate, or article to be coated, is not particularly restricted but, in cases where it is required to make the most of the heat resistance of the fluoroelastomer (A), it is preferably a substrate made of a heat-resistant material.

When the aqueous fluoroelastomer curable composition according to the invention does not contain any fluororesin (E), the substrate made of heat-resistant materials may be any of the substrates having heat resistance within the range of 120 to 250° C., since the temperature for crosslinking the fluoroelastomer (A) is generally within that temperature range. When the aqueous fluoroelastomer curable composition according to the invention contains the fluororesin (E), the substrate is preferably one resistant to temperatures of 250° C. and higher in the case of FEP used as the fluororesin (E), to temperatures of 320° and higher in the case of PFA, and to temperatures of 350° C. and higher in the case of PTFE, so that the fluororesin (E) may bleed up onto the coat surface. At temperatures within the above range, the fluororesin (E) can be caused to bleed up and the coat surface can be rendered nonsticky.

The heat-resistant material is not particularly restricted but includes, among others, metals such as iron, stainless steel, copper, aluminum and brass; heat-resistant glass species; heat-resistant synthetic fibers; ceramics; heat-resistant resins such as polyimides, polyamideimides, polysulfones, polyethersulfones and polyetheretherketones; and heat-resistant rubbers such as silicone rubbers and fluororubbers. The substrate may also be a glass plate; a glass fiber-based woven or nonwoven fabric; or a natural fiber- or synthetic fiber-based woven or nonwoven fabric, for instance.

The method of applying the aqueous fluoroelastomer curable composition onto the substrate mentioned above is not particularly restricted but includes, among others, spray coating, roll coating, spin coating, barrel coating, curtain flow coating and dip coating.

The coating film obtained by the above-mentioned application may be dried, if necessary, prior to baking. The drying procedure is not particularly restricted but, for example, drying at room temperature may be combined with 10 to 60 minutes of drying with warming at 60 to 120° C.

The baking conditions are not particularly restricted but, when the fluororesin (E) is used, for instance, heating can be carried out at 130 to 400° C. for 5 to 60 minutes in view of the decomposition temperature of the fluororesin (E). A preferred lower limit to the baking temperature is 150° C., and a preferred upper limit is 360° C.

In the coated article (1) of the invention, where the aqueous fluoroelastomer curable composition according to the invention comprises a fluororesin-containing fluoroelastomer composition, the coating film can be rendered a graded one such that the fluoroelastomer (A)-based crosslinked structure constitutes the substrate-contacting side thereof and the fluororesin (E)-based component occurs on the surface side opposite to the substrate. The coated article (1) of the invention which has such a graded coating film is endowed with the nonstickiness, lubricity and like surface characteristics of the fluororesin as well as elasticity and heat resistance, hence is useful in a wide range of applications.

The coated article of the invention may also comprise a substrate, a coating film obtained by applying the aqueous fluoroelastomer curable composition onto the substrate, followed by baking, and a fluororesin layer formed on the above coating film (hereinafter sometimes referred to as "coated article (2)").

The fluororesin layer is a layer comprising a fluororesin. The fluororesin layer-forming fluororesin (hereinafter referred to as "fluororesin (F)") is not particularly restricted but, for example, the same species as mentioned above referring to the fluororesin (E) can be used.

The coated article (2) of the invention has a laminate structure comprising a layer formed from the fluoroelastomer (A) and a layer comprising the fluororesin, formed in the manner of lamination in that order. Since this laminate structure is in common with that of the coated article (1), the coated article (2) has the same surface characteristics, elasticity and heat resistance as those of the above-mentioned coated article (1) of the invention.

The above fluororesin layer may be a coating film obtained by applying a coating composition comprising the fluororesin (F) (such layer hereinafter referred to as "resin coating film") onto a coating film obtained from the aqueous fluoroelastomer curable composition (such layer hereinafter referred to as "rubber coating film"), or a layer resulting from lamination of a film or tube produced in advance on the rubber coating film. The adhesion between the film or tube and the rubber coating film may be realized, for example, by the method comprising placing the film or tube on the rubber coating film, followed by heat fusion, or by the method comprising applying an adhesive onto the rubber coating film and then laying the film or tube thereon. Preferred as the fluororesin layer is the coating film obtained from a fluororesin (F) coating composition comprising fluororesin (F) in view of the process simplicity viewpoint.

The coated article (2) of the invention is preferably one obtained by using a fluororesin-containing fluoroelastomer composition in the aqueous fluoroelastomer curable composition. When such a fluororesin-containing fluoroelastomer composition is used, the surface of the coating film obtained from the fluororesin-containing fluoroelastomer composition will be made of a layer comprising the fluororesin (E) and, therefore, will generally be superior in adhesion to the above-mentioned fluororesin layer for reasons of compatibility.

As the fields of application of the coated article of the invention, there may be mentioned nonstickiness uses, for example rolls for OA equipment, belts for OA equipment and conveying belts; corrosion resistant and lubricating uses, for example packing rubbers, valve seals, O-rings, diaphragms, chemical-resistant tubes, drug container stoppers, fuel hoses and gaskets; corrosion-resistant uses for washing tools and so forth, for example various plating baths and other washing baths, coating material blender tanks, fuel holder or liquid chemical tank inner walls, vessels, columns, centrifuges, agitating blades, mixing rolls, and washing tools for precision machines; surface modifiers for metals, rubbers, plastics, glasses and so on; and mold release uses for various resin molding tools and dies and so forth.

EFFECTS OF THE INVENTION

The aqueous fluoroelastomer curable composition according to the invention, which has the constitution described above, is excellent in storage stability.

BEST MODES FOR CARRYING OUT THE INVENTION

The following experimental examples illustrate the present invention more concretely. These examples are, however, by no means limitative of the scope of the invention.

EXPERIMENTAL EXAMPLE 1

1. Preparation of a Fluoroelastomer Aqueous Dispersion (a)

A vinylidene fluoride [VdF]/tetrafluoroethylene [TFE]/hexafluoropropylene [HFP] copolymer (monomer composition VdF:TFE:HFP=65:18:17 (mole ratio)) was prepared by emulsion polymerization, and the latex obtained was concentrated and adjusted using surfactant solutions (a 20% (by mass) aqueous solution of a 1:1 (by mass) mixture of Diichi Kogyo Seiyaku's products TDS-70 and TDS-80, and a 20% (by mass) aqueous solution of Diichi Kogyo Seiyaku's product TDS-120; in all the products, the main component is $C_{13}H_{27}$—$O(CH_2CH_2O)_nH$, n=7, 8, 12) to give a fluoroelastomer aqueous dispersion (a) with a solid matter concentration of 60% by mass.

2. Preparation of a Pigment Paste (Pig Paste A)

Twelve (12) parts by mass of MT carbon black (product of ConCarb Ltd.) as a filler and 3 parts by mass of a hydrotalcite compound $Mg_{4.3}Al_2(OH)_{12.6}CO_3 \cdot mH_2O$ (trademark: DHT-4A, product of Kyowa Chemical Industry) as an acid acceptor were dispersed, together with 2 parts by mass of a 20% (by mass) aqueous solution of a surfactant (trademark: TDS-80, product of Daiichi Kogyo Seiyaku), in 28 parts by mass of pure water to give Pig paste A.

3. Preparation of an Aqueous Salt (D) Solution

A 10% aqueous solution of diammonium citrate (salt of citric acid with a pKa=4.35 with ammonia with a pKa=9.21) was adjusted to pH=8.5 by addition of a small amount of aqueous ammonia to give an aqueous salt (D) solution.

4. Preparation of a Polyamine Curing Agent Aqueous solution (V)

Eight (8) parts by weight of a 50% aqueous solution of 3,9-bis(3-aminopropyl)-2,4,8,10-tetraoxa-2-spiro[5.5]undecane (trademark: Epomate F-100, product of Yuka Shell) and 32 parts by weight of a 62.5% aqueous solution of γ-aminopropyltriethoxysilane (trademark: Sila-Ace S-330, product of Chisso'Corp.) were blended up to give a polyamine curing agent aqueous solution (V).

5. Preparation of an Aqueous Fluoroelastomer Curable Composition (Composition a)

One (1) part by mass of the aqueous salt (D) solution was admixed with 100 parts by mass of the fluoroelastomer aqueous dispersion (a), and 7 parts by mass of the thus obtained pH-adjusted fluoroelastomer dispersion was mixed up with 3 parts by mass of Pig paste A and 0.3 part by mass of a thickening agent (trademark: SN Thickener A-812, product of San-Nopco) for sufficient dispersion to give a main material fluoroelastomer aqueous dispersion (dispersion a). To 20 parts by mass of the main material fluoroelastomer aqueous dispersion (a) was added 1 part by mass of the polyamine type curing agent aqueous solution (V) as a polyamine curing agent. The subsequent thorough stirring gave an aqueous fluoroelastomer curable composition (composition a).

<Storage Stability of the Main Material Fluoroelastomer Aqueous Dispersion>

A portion of the main material fluoroelastomer aqueous dispersion (a) was placed in a polyethylene bottle, which was tightly closed and allowed to stand in a constant-temperature bath maintained at 40° C. Viscosity, pH and maximum dispersed particle diameter measurements were made at one-week intervals for evaluating the storage stability of the main material fluoroelastomer aqueous dispersion (a). The viscosity measurement was made using a viscometer (trademark: Type BM Viscometer, product of Tokyo Keiki Co.), the pH measurement was made using a pH meter (trademark: pH Meter F-12, product of Horiba Ltd.), and the maximum particle diameter measurement was made using a grind gage (powder/fluid measuring apparatus, product of Tsutsui Rikagaku Kikai).

6. Manufacture of a Coated Article

A primer (trademark: GLP-102NR, product of Daikin Industries) was applied to the surface of an aluminum sheet to a dry thickness of about 5 μm in the manner of spray coating, followed by 15 minutes of drying at 80° C.

The aqueous fluoroelastomer curable composition (composition a) was applied onto the primer layer obtained in the manner of spray coating, followed by 15 minutes of drying at 80 to 100° C. and then by 30 minutes of baking at 250° C. to give a coated article with a total layer thickness of about 35 μm, including the primer layer.

7. Preparation of a Coating Film for Coating Film Physical Characteristics Measurements The aqueous fluoroelastomer curable composition (composition a) was poured into a fluororesin-coated metal vat, followed by 5 days of drying at room temperature, further followed by thorough drying at 80 to 100° C. The coating film was then baked at 250° C. for 30 minutes. The thus-formed film was peeled off and submitted to coating film physical characteristics measurements.

Coating Film Physical Characteristics Evaluation

The coating film was evaluated for nonstickiness and tensile characteristics in the following manner.

<Nonstickiness>

One drop of pure water or n-cetane was dropped onto the coated article surface, and the contact angle was measured using a goniometer (product of Kyowa Interface Science Co.).

<Tensile Characteristics>

JIS No. 4 dumbbell-shaped samples were punched out from the coating film for coating film physical characteristics measurements and subjected to tensile testing according to JIS K 6251 (1993) at a pulling rate of 500 mm/minute, and the 100% tensile stress, tensile strength at break and tensile elongation at break were measured.

EXPERIMENTAL EXAMPLE 2

1. Preparation of a Fluororesin Aqueous Dispersion (a)

A TFE/HFP copolymer (monomer composition: TFE: HFP=85:15 (mole ratio)) was produced by emulsion polymerization using ammonium perfluorooctanoate (trademark: Unidyne DS-101, product of Daikin Industries) as an emulsifier, the latex obtained was concentrated using the same surfactant solution as used in Experimental Example 1 for preparing the fluoroelastomer aqueous dispersion (a) to give a fluororesin aqueous dispersion (dispersion a) with a solid matter concentration of 52% by mass.

2. Preparation of a Pigment Paste (Pig Paste B)

Three (3) parts by mass of red iron oxide (trademark: Tarox R-516L, product of Titan Kogyo) used as a filler and 5 parts by mass of the same acid acceptor as used in Experimental Example 1 were dispersed, together with 2 parts by mass of the same surfactant as used in Experimental Example 1 in preparing Pig paste A, in 46 parts by mass of pure water to give Pig paste B.

3. Preparation of an Aqueous Fluoroelastomer Curable Composition (Composition b)

One (1) part by mass of the same aqueous salt (D) solution as used in Experimental Example 1 was admixed with 100 parts by mass of the same fluoroelastomer aqueous dispersion (a) as used in Experimental Example 1, and 38 parts by mass of the thus-obtained pH-adjusted fluoroelastomer aqueous dispersion, 44 parts by mass of the fluororesin aqueous dispersion a, 12 parts by mass of Pig paste B and 0.3 part by mass of a thickening agent (trademark: SN Thickener A-812, product of San-Nopco) were mixed up together for sufficient dispersion to give a main material fluoroelastomer aqueous dispersion (dispersion b). To 100 parts by mass of the main material fluoroelastomer aqueous dispersion (b) was added 5 parts by mass of the polyamine curing agent aqueous solution (V), followed by thorough stirring to give an aqueous fluoroelastomer curable composition (composition b). A coating film was produced and subjected to coating film physical characteristics evaluation in the same manner as in Experimental Example 1 except that the aqueous fluoroelastomer curable composition (b) was used in lieu of the aqueous fluoroelastomer curable composition (a).

EXPERIMENTAL EXAMPLE 3

1. Preparation of a Fluoroelastomer Dispersion.

A VdF/TFE/HFP copolymer (monomer composition: VdF:TFE:HFP=65:18:17 (mole ratio)) was produced by emulsion polymerization, and latex obtained was concentrated using surfactant solutions (a 20% (by mass) aqueous solution of NOF Corporation's HS-208 and a 20% (by mass) aqueous solution of NOF Corporation's HS-215; in both the surfactants, the main component is $C_8H_{17}$—Ph—O$(CH_2CH_2O)_nH$, n=8, 15) to give a fluoroelastomer dispersion with a solid matter concentration of 60% by mass.

2. Preparation of a Pigment Paste (Pig Paste C)

Three (3) parts by mass of the same filler as used in Experimental Example 2 and 5 parts by mass of the same acid acceptor as used in Experimental Example 1 were dispersed, together with 2 parts by mass of a 20% (by mass) solution of a surfactant (20% (by mass) aqueous solution of Daiichi Kogyo Seiyaku's HS-208; the main component of the surfactant is $C_8H_{17}$—Ph—$O(CH_2CH_2O)_nH$, n=8), in 46 parts by mass of pure water to give Pig paste C.

3. Preparation of an Aqueous Fluoroelastomer Curable Composition (Composition c)

One (1) part by mass of the same aqueous salt (D) solution as used in Experimental Example 1 was admixed with 100 parts by mass of the fluoroelastomer dispersion, and 7 parts by mass of the thus-obtained pH-adjusted fluoroelastomer dispersion, 3 parts by mass of Pig paste C and 0.3 part by mass of a thickening agent (trademark: SN Thickener A-812, product of San-Nopco) were mixed up together for sufficient dispersion to give a main material fluoroelastomer aqueous dispersion (dispersion c). To 20 parts by mass of this main material fluoroelastomer aqueous dispersion (c) was added 1 part by mass of the polyamine curing agent aqueous solution (V). Thus was prepared an aqueous fluoroelastomer curable composition (composition c). A coating film was produced and subjected to coating film physical characteristics evaluation in the same manner as in Experimental Example 1 except that the aqueous fluoroelastomer curable composition (c) was used in lieu of the aqueous fluoroelastomer curable composition (a).

EXPERIMENTAL EXAMPLE 4

Preparation of an Aqueous Fluoroelastomer Curable Composition (Composition d)

One (1) part by mass of a polyol type curing agent (10% (by mass) aqueous solution of bisphenol AF ammonium salt) and 0.1 part by mass of a 50% (by mass) solution of diazabicycloundecene [DBU] formate in dipropylene glycol as a curing accelerator (trademark: SA610-50, product of San-Apro) were admixed with 20 parts by mass of the same main material fluoroelastomer aqueous dispersion (a) as obtained in Experimental Example 1, followed by thorough stirring to give an aqueous fluoroelastomer curable composition (composition d). A coating film was produced and subjected to coating film physical characteristics evaluation in the same manner as in Experimental Example 1 except that the aqueous fluoroelastomer curable composition (d) was used in lieu of the aqueous fluoroelastomer curable composition (a).

EXPERIMENTAL EXAMPLE 5

Preparation of an Aqueous Fluoroelastomer Curable Composition (Composition e)

Three (3) parts by mass of the same Pig paste A as used in Experimental Example 1 and 0.3 part by mass of a thickening agent (trademark: SN Thickener A-812, product of San-Nopco) were admixed with 7 parts by mass of the same fluoroelastomer aqueous dispersion (a) as used in Experimental Example 1 for thorough dispersion to give a main material fluoroelastomer aqueous dispersion (dispersion d). To 20 parts by mass of this main material fluoroelastomer aqueous dispersion (d) was added 1 part by mass of the polyamine curing agent aqueous solution (V). After thorough mixing, there was obtained an aqueous fluoroelastomer curable composition (composition e). A coating film was produced and subjected to coating film physical characteristics evaluation in the same manner as in Experimental Example 1 except that the aqueous fluoroelastomer curable composition (e) was used in lieu of the aqueous fluoroelastomer curable composition (a).

EXPERIMENTAL EXAMPLE 6

1. Preparation of a Pigment Paste (Pig Paste D)

Twelve (12) parts by mass of the same filler as used in Experimental Example 1 and 3 parts by mass of magnesium oxide (trademark: Kyowamag MA-150, product of Kyowa Chemical Industry) as an acid acceptor were dispersed, together with 2 parts by mass of a 20% (by mass) aqueous solution of a surfactant (trademark: Noigen TDS-80, product of Daiichi Kogyo Seiyaku), in 28 parts by mass of pure water to give Pig paste D.

2. Preparation of an Aqueous Fluoroelastomer Curable Composition (Composition f)

One (1) part by mass of the same aqueous salt (D) solution as used in Experimental Example 1 was admixed with 100 parts by mass of the same fluoroelastomer aqueous dispersion (a) as used in Experimental Example 1 to give a pH-adjusted fluoroelastomer dispersion. Three (3) parts of Pig-paste D and 0.3 part by mass of a thickening agent (trademark: SN Thickener A-812, product of San-Nopco) were admixed with 7 parts by mass of the above fluoroelastomer dispersion for thorough dispersion to give a main material fluoroelastomer aqueous dispersion (dispersion e). One (1) part by mass of the curing agent polyamine-containing aqueous solution (V) was added to 20 parts by mass of the main material fluoroelastomer aqueous dispersion (e). After thorough mixing, there was obtained an aqueous fluoroelastomer curable composition (composition f). A coating film was produced and subjected to coating film physical characteristics evaluation in the same manner as in Experimental Example 1 except that the aqueous fluoroelastomer curable composition (f) was used in lieu of the aqueous fluoroelastomer curable composition (a).

The compositions and coating film physical characteristics as employed or found in the above-mentioned experimental examples are shown in Table 1, and the physical changes with time as found with the main material fluoroelastomer aqueous dispersion are shown in Table 2.

TABLE 1

| | | | Experimental Example 1 | Experimental Example 2 | Experimental Example 3 | Experimental Example 4 | Experimental Example 5 | Experimental Example 6 |
|---|---|---|---|---|---|---|---|---|
| Fluoro-elastomer main material | Fluoro-elastomer aqueous dispersion | Fluoroelastomer (A) comonomer composition (mole %) | colspan VdF:TFE:HFP = 65:18:17 | | | | | |
| | | Surfactant | TDS-70 TDS-80 TDS-120 | TDS-70 TDS-80 TDS-120 | HS-208 HS-215 | TDS-70 TDS-80 TDS-120 | TDS-70 TDS-80 TDS-120 | TDS-70 TDS-80 TDS-120 |
| | | Salt (D) | Ammoniac ammonium citrate | Ammoniac ammonium citrate | Ammoniac ammonium citrate | Ammoniac ammonium citrate | None | Ammoniac ammonium citrate |

TABLE 1-continued

|  |  |  | Experimental Example 1 | Experimental Example 2 | Experimental Example 3 | Experimental Example 4 | Experimental Example 5 | Experimental Example 6 |
|---|---|---|---|---|---|---|---|---|
|  | Pig paste | Surfactant | TDS-80 | TDS-80 | HS-208 | TDS-80 | TDS-80 | TDS-80 |
|  |  | Acid acceptor | DHT-4A | DHT-4A | DHT-4A | DHT-4A | DHT-4A | MA-150 |
|  |  | Thickening agent | SN Thickener A-812 | SN Thickener A-812 | SN Thickener A-812 | SN Thickener A-812 | SN Thickener A-812 | SN Thickener A-812 |
|  | Fluororesin (E) comonomer composition (mole %) |  | — | TFE:HFP = 85:15 | — | — | — | — |
|  | Fluoroelastomer-curing agent |  | Polyamine curing | Polyamine curing | Polyamine curing | Polyol curing | Polyamine curing | Polyamine curing |
| Coating film physical characteristics | Nonstickiness (contact angle) (degrees) | Pure water | 97 | 109 | 96 | 96 | 96 | 95 |
|  |  | n-Cetane | 46 | 54 | 44 | 45 | 45 | 45 |
|  | Tensile characteristics | 100% tensile stress (MPa) | 5.3 | 10.2 | 5.5 | 4.1 | 6.6 | 9.1 |
|  |  | Strength at break (MPa) | 13.3 | 19.3 | 13.0 | 8.0 | 12.4 | 10.9 |
|  |  | Elongation at break (%) | 330 | 240 | 300 | 440 | 270 | 170 |

TABLE 2

|  |  | Period of storage at 40° C. | | | | |
|---|---|---|---|---|---|---|
|  | Properties | 0 (initial) | 1 week | 2 week | 3 week | 4 week |
| Experimental Example 1 | Viscosity (25° C.) (mPa · s) | 66 | 69 | 68 | 71 | 73 |
|  | pH | 7.8 | 7.8 | 7.5 | 7.4 | 7.4 |
| Experimental Example 4 | Maximum particle diameter (μm) | <5 | <5 | <5 | <5 | <5 |
| Experimental Example 2 | Viscosity (25° C.) (mPa · s) | 112 | 131 | 133 | 136 | 135 |
|  | pH | 8 | 8.1 | 7.9 | 8 | 7.9 |
|  | Maximum particle diameter (μm) | <5 | <5 | <5 | <5 | <5 |
| Experimental Example 3 | Viscosity (25° C.) (mPa · s) | 119 | 123 | 124 | 132 | 146 |
|  | pH | 7.7 | 7.6 | 7.6 | 7.6 | 7.6 |
|  | Maximum particle diameter (μm) | <5 | <5 | <5 | <5 | 5 |
| Experimental Example 5 | Viscosity (25° C.) (mPa · s) | 54 | 73 | 112 | 130 | 148 |
|  | pH | 6.6 | 7.1 | 7.3 | 7.4 | 7.4 |
|  | Maximum particle diameter (μm) | <5 | <5 | <5 | 5 | 5 |
| Experimental Example 6 | Viscosity (25° C.) (mPa · s) | 100 | 97 | 123 | 138 | 75 |
|  | pH | 9.1 | 9.2 | 9 | 8.9 | 9.1 |
|  | Maximum particle diameter (μm) | <5 | 10 | 15 | 15 | 15 |

The data shown in Tables 1 and 2 revealed that viscosity increases and flocculation progress with time were observed in Experimental Example 3 in which an alkylphenol-based dispersant was used, in Experimental Example 5 in which no salt (D) was used and in Experimental Example 6 in which the initial pH was above 8.5 and, in Experimental Example 6, the coating film was inferior in elongation, in particular, whereas, in Experimental Examples 1, 2 and 4, the coating films were excellent in physical properties and suppressed viscosity increases and flocculation were observed. The sudden decease in viscosity after 4 weeks of storage in Experimental Example 6 as shown in Table 2 is a result of precipitation of the flocculate; the viscosity of the supernatant decreased accordingly.

INDUSTRIAL APPLICABILITY

The aqueous fluoroelastomer curable composition according to the invention can be properly used, for example, in those fields in which long-term storage of the fluoroelastomer composition is required.

The invention claimed is:

1. An aqueous fluoroelastomer curable two-liquid type composition comprising one liquid being a main material fluoroelastomer aqueous dispersion (I) and the other liquid being a fluoroelastomer-curing agent aqueous solution (II),
   wherein said main material fluoroelastomer aqueous dispersion (I) is an aqueous dispersion having a pH of 6.5 to 8.5 and comprising a fluoroelastomer (A), a dispersant (B), an acid acceptor (C) and a salt (D) composed of an acid with a pKa of 4 to 6 selected from the group consisting of acetic acid, succinic acid, and citric acid and a base with a pKa of 8 to 12 selected from the group consisting of ammonia and triethylamine, said dispersant (B) is an aliphatic polyoxyalkylene ether dispersant (B 1), and
   said fluoroelastomer-curing agent aqueous solution (II) is an aqueous solution comprising a fluoroelastomer-curing agent.

2. The aqueous fluoroelastomer curable composition according to claim 1,
   wherein the aliphatic polyoxyalkylene ether dispersant (B 1) comprises an aliphatic polyoxyalkylene ether compound represented by the general formula (i):

(wherein $R^1$ represents a straight or branched, saturated or unsaturated acyclic aliphatic hydrocarbon group containing 8 to 18 carbon atoms or a saturated alicyclic hydrocarbon group containing 8 to 18 carbon atoms, n represents an integer of 3 to 25 and m represents an integer of 0 to 5).

3. The aqueous fluoroelastomer curable composition according to claim 1,
wherein the acid acceptor (C) is an inorganic double compound-based acid acceptor (C1) represented by formula (ii):

$$[M^1X^1]\ldots[M^xX^x]\cdot yH_2O \qquad (ii)$$

wherein $M^1, \ldots M^x$ each independently represents a metallic element or a metal cation, $X^1, \ldots X^x$ each independently represents an atom such as an oxygen, halogen, nitrogen, sulfur or phosphorus atom, a molecule such as an ammonia or carbon dioxide, or an anion such as $OH^-$, $F^-$, $Cl^-$, $Br^-$, $I^-$, $CN^-$, $SCN^-$, $CO_3^{2-}$, $NO^{3-}$, $SO_4^{2-}$ or $PO_4^{3-}$, x represents an integer of 2 to 10 and y represents an integer of 0 to 20 provided that at least one of the above-given $M^1, \ldots$ and $M^x$ represents an alkaline earth metal element.

4. The aqueous fluoroelastomer curable composition according to claim 1,
wherein the dispersant (B) amounts to 2 to 20 parts by mass per 100 parts by mass of the solid matter in the main material fluoroelastomer aqueous dispersion (I).

5. The aqueous fluoroelastomer curable composition according to claim 1, which further comprises a fluororesin (E),
the amount of said fluororesin (E) being larger than 0% by mass but not larger than 80% by mass relative to the total amount of the fluoroelastomer (A) and said fluororesin (E).

6. A coated article comprising a substrate and a coating film obtained by applying the aqueous fluoroelastomer curable composition according to claim 1, onto said substrate, followed by baking.

7. A coated article comprising a substrate, a coating film obtained by applying the aqueous fluoroelastomer curable composition according to claim 5, onto said substrate, followed by baking, and a fluororesin layer formed on said coating film.

* * * * *